United States Patent
Ho et al.

(10) Patent No.: US 11,100,266 B2
(45) Date of Patent: *Aug. 24, 2021

(54) GENERATING INTEGRATED CIRCUIT FLOORPLANS USING NEURAL NETWORKS

(71) Applicant: Google LLC, Mountain View, CA (US)

(72) Inventors: Chian-min Richard Ho, Palo Alto, CA (US); William Hang, Stanford, CA (US); Mustafa Nazim Yazgan, Cupertino, CA (US); Anna Darling Goldie, Mountain View, CA (US); Jeffrey Adgate Dean, Palo Alto, CA (US); Azalia Mirhoseini, San Jose, CA (US); Emre Tuncer, Santa Cruz, CA (US); Ya Wang, Foster City, CA (US); Anand Babu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,130

(22) Filed: Jun. 1, 2020

(65) Prior Publication Data
US 2020/0364389 A1 Nov. 19, 2020

Related U.S. Application Data

(63) Continuation of application No. 16/703,837, filed on Dec. 4, 2019, now Pat. No. 10,699,043.
(Continued)

(51) Int. Cl.
*G06F 30/00* (2020.01)
*G06F 30/30* (2020.01)
(Continued)

(52) U.S. Cl.
CPC ............ *G06F 30/27* (2020.01); *G06F 30/392* (2020.01)

(58) Field of Classification Search
None
See application file for complete search history.

(56) References Cited

U.S. PATENT DOCUMENTS 5,222,210 A 6/1993 Leivian
9,792,397 B1 10/2017 Nagaraja
(Continued)

OTHER PUBLICATIONS

J.W. Jiang et al., "A New Self-Organisation Strategy for Floorplan Design," 1992 IEEE, pp. 510-515. (Year: 1992).*
(Continued)

*Primary Examiner* — Leigh M Garbowski
(74) *Attorney, Agent, or Firm* — Fish & Richardson P.C.

(57) ABSTRACT

Methods, systems, and apparatus, including computer programs encoded on computer storage media, for generating a computer chip floorplan. One of the methods includes obtaining netlist data for a computer chip; and generating a computer chip floorplan, comprising placing a respective node at each time step in a sequence comprising a plurality of time steps, the placing comprising, for each time step: generating an input representation for the time step; processing the input representation using a node placement neural network having a plurality of network parameters, wherein the node placement neural network is configured to process the input representation in accordance with current values of the network parameters to generate a score distribution over a plurality of positions on the surface of the computer chip; and assigning the node to be placed at the time step to a position from the plurality of positions using the score distribution.

40 Claims, 4 Drawing Sheets

Related U.S. Application Data

(60) Provisional application No. 62/775,284, filed on Dec. 4, 2018.

(51) Int. Cl.
  *G06F 30/27* (2020.01)
  *G06F 30/392* (2020.01)

(56) References Cited

U.S. PATENT DOCUMENTS

| | | | |
|---|---|---|---|
| 10,372,859 B2 | 8/2019 | Nagaraja | |
| 10,817,634 B2 * | 10/2020 | Oh | G06F 30/398 |
| 10,824,946 B2 * | 11/2020 | Fortunato | G06N 3/0445 |
| 2016/0117436 A1 | 4/2016 | Ng | |
| 2017/0103303 A1 | 4/2017 | Henry | |
| 2018/0336453 A1 * | 11/2018 | Merity | G06N 3/0445 |
| 2019/0340509 A1 | 11/2019 | Osindero | |

OTHER PUBLICATIONS

X.Q. Li et al., "Machine Learning-Based VLSI Cells Shape Function Estimation," IEEE Trans. on Computer-Aided Design of Integrated Circuits and Systems, vol. 17, No. 7, Jul. 1998, pp. 613-623. (Year: 1998).*
A. De Gloria et al., "Block Placement With a Boltzmann Machine," IEEE Trans. on Computer-Aided Design of Integrated Circuits and Systems, vol. 13, No. 6, Jun. 1994, pp. 694-701. (Year: 1994).
Aykanat et al, "A fast neural-network algorithm for VLSI cell placement" Neural Networks, 1998, 14 pages.
Bello, et al., "Neural combinatorial optimization with reinforcement learning," ICLR, Nov. 2016, 15 pages.
D. Caviglia et al., "Neural Algorithms for Cell Placement in VLSI Design," Int; 1989 Joint Conference on Neural Networks, IEEE, pp. 573-580. (Year: 1989).
D. JJ. Chen et al., "Automatic Layout Generation for Mixed Analog-Digital VLSI Neural Chips," 1990 IEEE, pp. 29-32. (Year: 1990).
Dai, et al., "Learning combinatorial optimization algorithms over graphs," NIPS, 2017, 11 pages.
Espeholt, et al., "IMPALA: Scalable distributed deep-rl with importance weighted actor-learner architectures," Feb. 2018, 22 pages.
Gilmer, et al.,"Neural message passing for quantum chemistry," JMLR, Aug. 2017, 14 pages.
Hamilton, et al., "Inductive representation learning on large graphs," NIPS, 2017, 11 pages.
He et al, "Artificial neural network application in analog layout placement design" Electrical and Computer Engineering, 2009, 4 pages.
Heess, et al., "Emergence of locomotion behaviours in rich environments," arXiv:1707.02286, Jul. 2017, 14 pages.
Hwang, "Computational power and the social impact of artificial intelligence," SSRN, Mar. 2018, 47 pages.
I. L. Markov et al., "Progress and Challenges in VLSI Placement Research," Proc. of the IEEE, vol. 103, No. 11, Nov. 2015, pp. 1985-2003 (Year: 2015).
Ioffe and Szegedy,"Batch normalization. Accelerating deep network training by reducing internal covariate shift," PMLR, Feb. 2015, 37:448-456.
Kipf and Welling, "Semi-supervised classification with graph convolutional networks," ICLR, 2017, 14 pages.
Kirkpatrick, et al., "Optimization by simulated annealing," Science, May 1983, 220(4598):671-680.
Koch et al., "Siamese Neural Networks for One-shot Image Recognition," Proceedings of the 32nd International Conference on Machine Learning, 2015, 8 pages.
Kool, et al., "Attention solves your TSP, approximately," stat, Jun. 2018, 16 pages.
Korte and Vygen, "Combinatorial Problems in Chip Design," Building Bridges, 2008, 19:333-368.
Kumar, et al., "Resource-efficient machine learning in 2 kb ram for the internet of things," PMLR, Aug. 2017, 70:1935-1944.
LeCun, et al.,"Deep learning," Nature, May 2015, 521(7553):436-444.
Markov, et al., "Progress and Challenges in VLSI Placement Research," ICCAD, Oct. 2012, 275-282.
Mnih, et al., "Asynchronous methods for deep reinforcement learning," ICML, Jun. 2016, 19 pages.
Mohammadi, et al., "Deep learning for iot big data and streaming analytics: A survey," IEEE, Jun. 2018, 40 pages.
PCT International Search Report and Written Opinion in International Application No. PCT/US2019/064553, dated Apr. 6, 2020, 15 pages.
R. Sadananda et al., The Choice of Neighbourhood in Self-Organization Scheme for VLSI, 1994 IEEE, pp. 261-266. (Year: 1994).
Schulman, et al., "Proximal policy optimization algorithms," arXiv:1707.06347, Jul. 2017, 12 pages.
Smith, et al., "Federated multi-task learning," NIPS, 2017, 11 pages.
Sultana, "Research on Global Placement Algorithm Based on Neural Network and Simulated Annealing" Research Gate, 2018, 77 pages.
Sze, et al., "Hardware for machine learning: Challenges and opportunities," 2017 IEEE CICC, Apr. 2017, 9 pages.
Vaswani, et al., "Attention is all you need," NIPS, 2017, 15 pages.
Velickovic, et al., "Graph Attention Networks," ICLR, 2018, 12 pages.
PCT International Preliminary Report on Patentability in International Application No. PCT/US2019/064553, dated Jun. 17, 2021, 9 pages.

* cited by examiner

GENERATING INTEGRATED CIRCUIT FLOORPLANS USING NEURAL NETWORKS

CROSS-REFERENCE TO RELATED APPLICATIONS

This is a continuation of U.S. application Ser. No. 16/703,837, filed on Dec. 4, 2019, which claims priority to U.S. Provisional Application No. 62/775,284, filed on Dec. 4, 2018. The disclosures of the prior applications are considered part of and are incorporated by reference in the disclosure of this application.

BACKGROUND

This specification relates to using neural networks for electronic design automation and, more specifically, for generating a computer chip floorplan.

Computer chip floorplans are schematic representations of the placement of some or all of the circuits of a computer chip on the surface, i.e., the chip area, of the computer chip.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from received inputs in accordance with current values of a respective set of parameters.

SUMMARY

This specification describes a system implemented as computer programs on one or more computers in one or more locations that generates a chip floorplan for an integrated circuit. The integrated circuit for which the chip floorplan is being generated will be referred to in this specification as a "computer chip" and should generally be understood to mean any collection of electronic circuits that are fabricated on one piece of semiconductor material. The chip floorplan places each node from a netlist of nodes at a respective location on the surface of the computer chip.

Particular embodiments of the subject matter described in this specification can be implemented so as to realize one or more of the following advantages.

Floorplanning, which involves placing the components of a chip on the surface of the chip, is a crucial step in the chip design process. The placement of the components should optimize metrics such as area, total wire length and congestion. If a floorplan does not perform well on these metrics, the computer chip that is generated based on the floor plan will perform poorly. For example, the computer chip could fail to function, could consume an excessive amount of power, could have an unacceptable latency, or have any of a variety of other undesirable properties that are caused by sub-optimal placement of components on the chip.

The described techniques allow for a high-quality chip floorplan to be generated automatically and with minimal user involvement by making use of the described node placement neural network and the described training techniques. As a particular example, when distributed training is employed, a high-quality (i.e., a superhuman) placement can be generated in on the order of hours without any human-expert involvement.

Unlike the described systems, conventional floorplanning solutions employ weeks long processes that require heavy human involvement. Because of the enormous space of potential node placement combinations, conventional automated approaches have been unable to reliably generate high-quality floorplans without consuming an excessive amount of computational power and wall clock time, requiring human expert involvement, or both. By effectively making use of reinforcement learning to train the described node placement neural network, however, the described techniques are able to quickly generate a high-quality floorplan.

Furthermore, a computer chip which is produced using the method may have reduced power consumption compared to one produced by a conventional method. It may also have increased computing power for a given surface area, or from another point view be produced using fewer resources for a given amount of computing power.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
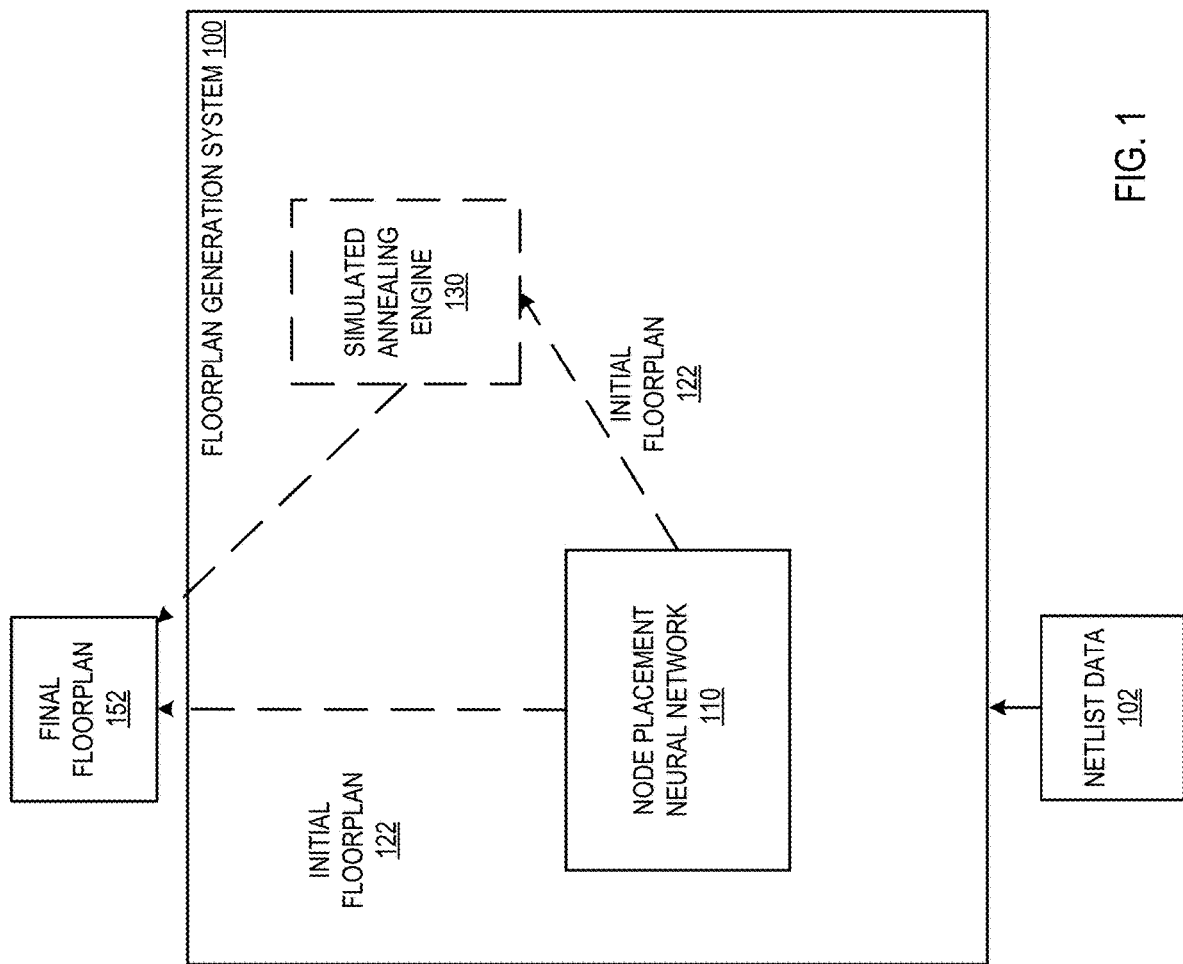
FIG. 1 shows an example floorplan generation system.

FIG. 1 shows an example floorplan generation system 100. The floorplan generation system 100 is an example of a system implemented as computer programs on one or more computers in one or more locations in which the systems, components, and techniques described below are implemented.

The system 100 receives netlist data 102 for a computer chip, i.e., a very large-scale integration (VLSI) chip, that is to be manufactured and that includes a plurality of integrated circuit components, e.g., transistors, resistors, capacitors, and so on. The plurality of integrated circuit components may be different depending on the desired function of the chip. For example, the chip can be a special-purpose chip, i.e., an application-specific integrated circuit (ASIC), for machine learning computations, video processing, cryptography, or another compute-intensive function.

The netlist data 102 is data describing the connectivity of the integrated circuit components of the computer chip. In particular, the netlist data 102 specifies a connectivity on the computer chip among a plurality of nodes that each correspond to one or more of a plurality of integrated circuit components of the computer chip. That is, each node corresponds to a respective proper subset of the integrated circuit components, and those subsets do not overlap. In other words, the netlist data 102 identifies, for each of the plurality of nodes, which other nodes (if any) the node needs to be connected to by one or more wires in the manufactured computer chip. In some cases, the integrated circuit components have already been clustered in clusters, e.g., by an external system or by using an existing clustering technique, and each node in the netlist data represents a different one of the clusters.

The system 100 generates, as output, a final computer chip floorplan 152 that places some or all of the nodes in the netlist data 102 at a respective position on the surface of the computer chip. That is, the final computer chip floorplan 152 identifies a respective position on the surface of the computer chip for some or all of the nodes in the netlist data 102 and, therefore, for the integrated circuit components that are represented by the node.

As one example, the netlist data 102 can identify three types of nodes: macros, clusters of standard cells, and ports. The system 100 can determine the placements for macros and clusters of standard cells, while the port placements can be fixed or can be determined by another system based on the placements determined by the system 100.

Generally, the floorplan 152 assigns each node to a grid square in an N×M grid overlaid over the surface of the chip, where N and M are integers that are provided as inputs to the system 100.

The system 100 includes a node placement neural network 110 and, optionally, a simulated annealing engine 130.

The system 100 uses the node placement neural network 110 to generate an initial computer chip floorplan 122. Like the final computer chip floorplan 152, the initial computer chip floorplan 122 also places each node in the netlist data 102 at a respective position on the surface of the computer chip.

The system 100 generates the initial chip floorplan 122 by placing a respective node from the netlist data 102 at each time step in a sequence of a plurality of time steps. That is, the system 100 generates the placement node-by-node over a number of time steps, with each node being placed at a location at a different one of the time steps.

At each particular time step in the sequence, the system generates an input representation for the particular time step and processes the input representation using the node placement neural network 110.

The input representation for the particular time step generally includes (i) except for the first time step in the sequence, partially placed chip data characterizing a partially placed chip (i.e., a chip design in which a proper subset of the nodes of the netlist has been placed) that indicates the placement of the nodes that have already been placed at time steps preceding the particular time step in the sequence and (ii) current node data characterizing the node to be placed at the particular time step. In the first time step of the sequence, the partially placed chip data indicates that no nodes have been placed, i.e., represents an empty chip. The input representation can also optionally include (e.g., as part of the current node data) netlist features that characterize the netlist of nodes, e.g., characterize the connectivity between the nodes that is specified in the netlist data 102. For example, the input representation may characterize for, one or more of the nodes, one or more other of the nodes to which that node is connected according to the netlist. In particular, the input representation may specify some or all of the nodes of the netlist to which the node to be placed at the particular time is connected according to the netlist, e.g., at least the one(s) of those nodes that have already been placed at time steps preceding the particular time step.

The node placement neural network 110 is a neural network that has parameters (referred to in this specification as "network parameters") and that is configured to process the input representation in accordance with current values of the network parameters to generate a score distribution, e.g., a probability distribution or a distribution of logits, over a plurality of positions on the surface of the computer chip. For example, the distribution can be over the grid squares in the N×M grid overlaid over the surface of the chip.

The system 100 then assigns the node to be placed at the particular time step to a position from the plurality of positions using the score distribution generated by the neural network.

The operations performed by the neural network 110 at a given time step and placing a node at the time step using the score distribution are described in more detail below with reference to FIGS. 2 and 3.

By adding nodes to the floorplan one by one, after the last time step in the sequence, the floorplan will include a respective placement for all of the nodes in the netlist data 102.

In order for the score distributions 124 generated by the neural network 110 to result in a high-quality floorplan, the system 100 trains the node placement neural network 110 through reinforcement learning to maximize a reward function.

As one example, the system 100 can train the neural network 110 through reinforcement learning to determine trained values of the network parameters, and then after the training has completed, generate the initial floorplan 122 by generating a floorplan using the neural network 110 and in accordance with the trained values of the network parameters.

The system can determine that training has terminated based on any of a variety of termination criteria. For example, the system can terminate the training after a certain amount of time has elapsed, after a certain number of candidate floorplans have been evaluated, or after the parameter values of the neural network 110 have converged.

As another example, the system 100 can track reward values assigned to candidate floorplans generated during the training of the neural network 110, and then, after the training has completed, select the candidate floorplan that has the highest reward value as the initial floorplan 122.

Generally, the reward function measures a quality of the floorplans generated using the node placement neural network 110, i.e., measures certain one or more characteristics of the generated floorplans that, when optimized, result in a chip that is manufactured using the generated floorplan exhibiting good performance, e.g., in terms of one or more of: power consumption, heat generation, and timing performance. The quality is typically an increasing function of these one or more characteristics.

During the training, the system 100 repeatedly generates candidate floorplans using the neural network 110, evaluates the value of the reward function for the generated candidate floorplan by evaluating the characteristics that are measured by the reward functions, and adjusts the values of the network parameters based on the value of the reward function.

Training the neural network 110 and reward functions that can be used for the training are described in more detail below with reference to FIG. 4.

In some implementations, once the neural network 110 has been trained, the system 100 outputs the initial computer chip floorplan 122 as the final computer chip floorplan 152.

In some other implementations, the system 100 generates the final computer chip floorplan 152 by performing simulated annealing using a cost function (e.g., by simulated annealing on the reward function) starting from the initial computer chip floorplan 122 generated using the node placement neural network 110. As a particular example, the system 100 can perform simulated annealing by applying a hill climbing algorithm to iteratively adjust the placements in the initial computer chip floorplan 122 to generate the final computer chip floorplan 152. Hill climbing algorithms and other simulated annealing techniques that can be used to adjust the initial computer chip floorplan 122 are described in more detail in S. Kirkpatrick, C. D. Gelatt, and M. P. Vecchi. Optimization by simulated annealing. SCIENCE, 220(4598):671-680, 1983.

Optionally, the system 100 or an external system may then fabricate (produce) a chip (integrated circuit) according to the one of the candidate floorplans, such as the one having the highest value of the reward function or the one generated once training has terminated. Such an integrated circuit may exhibit improved performance, e.g., have one or more of lower power consumption, lower latency, or smaller surface area, than one designed using a conventional design process, and/or be producible using fewer resources. The fabrication may use any known technique.

Figure 2:
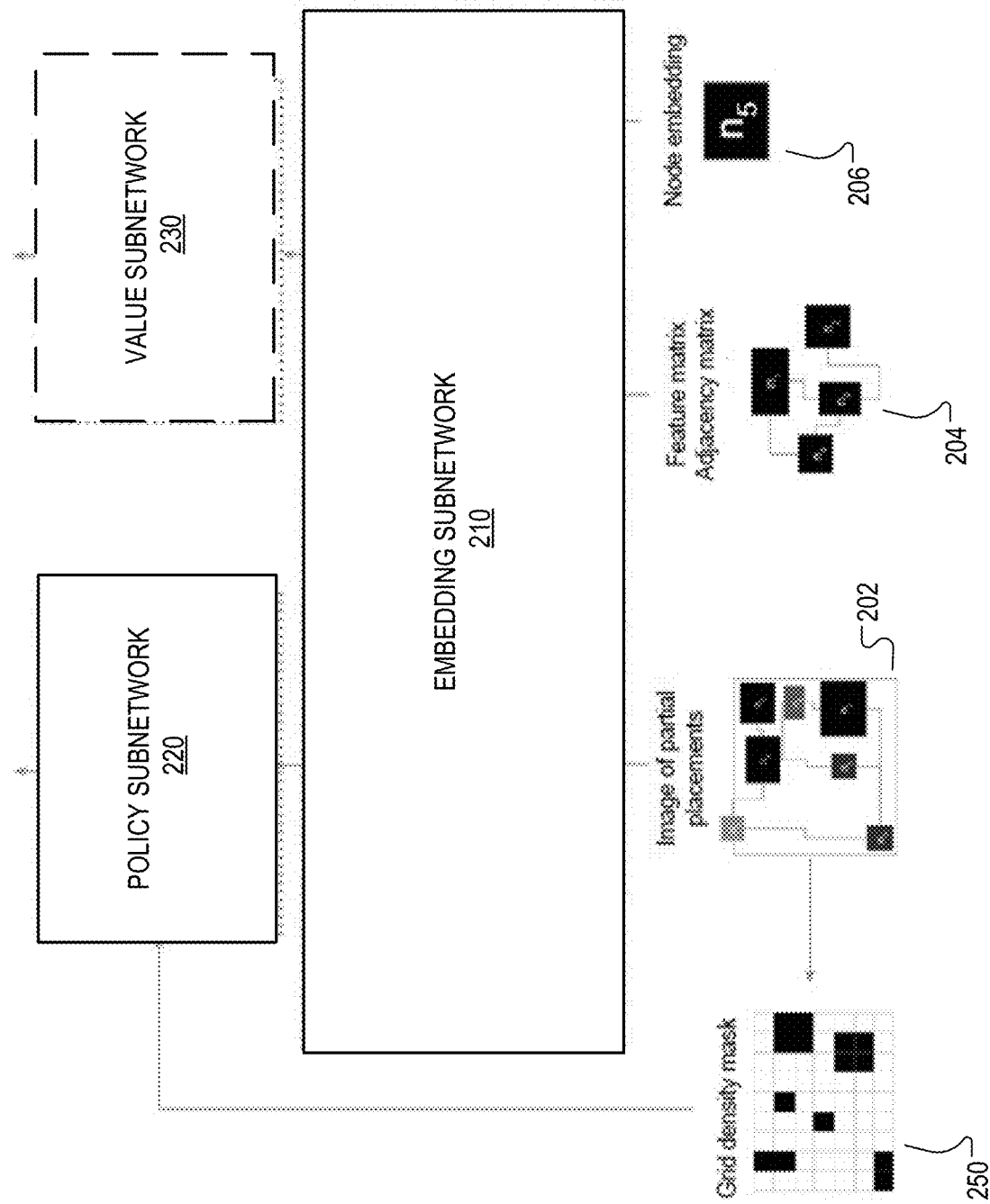
FIG. 2 illustrates the processing of the node placement neural network at a time step.

FIG. 2 shows the processing of the node placement neural network 110 at a given time step.

As described above with reference to FIG. 1, at each time step during generation of a floorplan, the node placement neural network 110 is configured to receive an input representation and to process the input representation to generate a score distribution, e.g., a probability distribution or a distribution of logits, over a plurality of locations on the surface of the computer chip.

Generally, the input representation includes (i) partially placed chip data that indicates the placement of the nodes that have already been placed at time steps preceding the particular time step in the sequence and (ii) current node data characterizing the node to be placed at the particular time step.

As shown in FIG. 2, the node placement neural network 110 includes an embedding subnetwork 210, a policy subnetwork 220, and, optionally, a value subnetwork 230.

The embedding subnetwork 210 is configured to, at each particular time step, process the input representation to generate an embedding of the input representation. An embedding is a numeric representation in a fixed dimensional space, i.e., an ordered collection of a fixed number of numeric values. For example, the embedding can be a vector or a matrix of floating point values or other type of numeric values.

The policy subnetwork 220 is configured to, at each particular time step, process the embedding to generate the score distribution. For example, the policy subnetwork 220 can be a recurrent neural network, i.e., a neural network that includes one or more recurrent neural network layers, e.g., long short-term memory (LSTM) layers, gated recurrent unit (GRU) layers, or other types of recurrent layers, with an output layer that generates the scores for the positions. For example, when the scores are probabilities, the output layer can be a softmax layer.

The value subnetwork 230, when used, is configured to, at each particular time step, process the embedding to generate a value estimate that estimates a value of a current state of the floorplan as of the particular time step. The value of the current state is an estimate of the output of the reward function for a floorplan that is generated starting from the current state, i.e., starting from the current, partial floorplan. For example, the value subnetwork 230 can also be a recurrent neural network or can be a feedforward neural network, e.g., one that includes one or more fully-connected layers.

This value estimate can be used during the training of the neural network 110, i.e., when using a reinforcement learning technique that relies on value estimates being available. In other words, when the reinforcement learning technique used to train the node placement neural network requires a value estimate, the node placement neural network 110 also includes the value subnetwork 230 that generates the value estimates that are required by the reinforcement learning technique.

Generally, the embedding subnetwork 210 processes the partially placed chip data using one set of neural network layers to generate a partially placed chip data embedding and the data characterizing the current node using another set of neural network layers to generate a current node data embedding and then concatenates these two embeddings to generate the final embedding of the state representation.

One example of a state representation that can be provided as input to the placement neural network 110 is one in which the partially placed chip data is a vector that includes a flattened representation of the N×M grid, i.e., a vector that includes a respective entry for each of the grid squares in the N×M grid. The flattened representation of the N×M grid can identify for, each grid square, whether a node has already been placed at the grid square and, optionally, which node (if any) has been placed at the grid square.

In this example, the subnetwork 210 can process the partially placed chip data using a feed-forward neural network, e.g., a multi-layer perceptron (MLP), to generate the partially placed chip embedding.

Another example of a state representation is one in which the partially placed chip data is an image of the surface of the partially placed chip that depicts the positions at which the nodes at time steps preceding the particular time step in the sequence have been placed.

This example is illustrated in FIG. 2.

In particular, in FIG. 2, the state representation includes an image 202 of the partially placed chip that shows the grid squares of the N×M grid. The image 202 depicts the position, the connectivity, and, optionally, the size of the nodes that have already been placed on the chip. As shown in the image of FIG. 2, when a node has already been placed at a given grid square, the image depicts a visual representation of the node at that grid square. Connections between two nodes can be represented as an edge between the two nodes in the image, e.g., drawn using taxicab geometry in the image.

The system also tracks the density of the positions on the chip, i.e., of the squares in the grid. In particular, the system maintains a density value for each position that indicates the degree to which that position is occupied. When a node has been placed at a given position, the density value for that position is set equal to one (or to a different maximum value that indicates that the position is fully occupied). When no node has been placed at the given position, the density value for that position indicates the number of edges that pass through the position.

In some implementations, the system uses the tracked density values when generating the input image. That is, the input image is generated based on the tracked density values for the positions on the surface of the chip. As one example, for any given position, the intensity values for the pixels that belong to the visual representation of the chip at that position can be based on the density value for the position, e.g., with locations that have higher density value shaving higher intensity values, e.g., with the intensity value being equal to or directly proportional to the density value. As another example, the input image can include an additional channel that includes the intensity values for the positions in the input image.

When the partially placed chip data is an image, the subnetwork 210 processes the image using a convolutional neural network to generate the partially placed chip embedding.

The data characterizing the current node that is included in the state representation can represent the current node in any appropriate way.

As one example, the current node data can be a one-hot vector that identifies which of the plurality of nodes is being placed at the current time step. In this example, the subnetwork 210 can process the current node data using an MLP, a single fully-connected layer, or an embedding layer to generate the current node data.

As another example, the current node data can include an embedding 206 of the current node, i.e., an embedding that is learned jointly with the training of the node placement neural network 110.

As another example, the current node data characterizing the node to be placed at the particular time step can include data characterizing the connectivity of the node to be placed at the particular time step specified by the netlist data, i.e., an adjacency vector or matrix identifying the nodes that are connected to the current node in the netlist data.

In some implementations, the input representation also includes netlist features 204 that characterize the netlist data. In particular, the netlist features can include respective features, e.g., a respective feature vector, for each node in the netlist and can identify the connectivity between the nodes in the netlist data. The features for each node can identify any of a variety of characteristics of the node.

In one example, the features for each node identify a size of the node. As another example, for each node that has already been placed at an earlier time step in the sequence, the features for the node identify the position at which the node was placed on the surface of the chip. If the node has not yet been placed, the features for the node can indicate a default position for the node. In the example of FIG. 2, the system combines the netlist features 204 into a feature matrix of the feature vectors and an adjacency matrix that specifies the connectivity between the nodes.

As another example, the netlist features 204 can also include port information, e.g., information regarding their connectivity to other nodes, and their location, even if the port nodes are not placed by the system.

As another example, the netlist features 204 can include the full name of the nodes in the netlist data, e.g., when names of the nodes have information related to the hierarchy of the node within the netlist graph, the location of the nodes, width and height of the nodes.

In implementations where the input representation includes the netlist features, the subnetwork 210 can process the netlist features and the current node data using any appropriate graph embedding mechanism to generate the current node embedding.

For example, the subnetwork 210 can process the netlist features and the current node data using a graph convolutional neural network (GCN) to generate the current node embedding. One example of a GCN that can be used by the subnetwork 210 is described in Thomas N. Kipf and Max Welling. Semi-supervised classification with graph convolutional networks. International Conference on Learning Representations, 2017.

As another example, the subnetwork 210 can process the netlist features and the current node data using a Siamese neural network to generate the current node embedding. One example of a Siamese neural network that can be used by the subnetwork 210 is described in Siamese neural networks for one-shot image recognition. G Koch, R Zemel, and R Salakhutdinov. In ICML Deep Learning workshop, 2015.

As another example, the subnetwork 210 can process the netlist features and the current node data using a Graphsage technique generate the current node embedding. One example of such a technique that can be used by the subnetwork 210 is described in Inductive Representation Learning on Large Graphs. W. L. Hamilton, R. Ying, and J. Leskovec arXiv:1706.02216 [cs.SI], 2017.

As described above, the system tracks the density at each of the positions on the surface of the chip, i.e., for each of the grid squares of the N×M grid. Once the policy neural network has generated the score distribution at the time step, the system uses the density to generate a modified score distribution and then assigns the node corresponding to the time step using the modified score distribution.

For example, the system can assign the node to the position having the highest score in the modified score distribution or sample a position from the modified score distribution, i.e., so that each position has a likelihood of being selected that is equal to the likelihood and then assign the node to the sampled position.

To modify the score distribution, the system sets the score for any position, i.e., any grid square, that has a density that is above a threshold value to zero.

This is represented in FIG. 2 as a grid density mask 250 which can be applied to the score distribution, i.e., as a mask in which the value for any position that has a density that is above the threshold value is zero and the value for any position that has a density that is not above the threshold value is one. As a particular example, the threshold can be equal to one and the system can set the score for any position at which a node has already been placed, i.e., that has a density value of one, to zero. As another example, the threshold can be less than one, indicating that the system also sets the score to zero for any position that does not have a node but that has too many wires running through it (i.e., the number of wires associated with a position is above a threshold).

Figure 3:
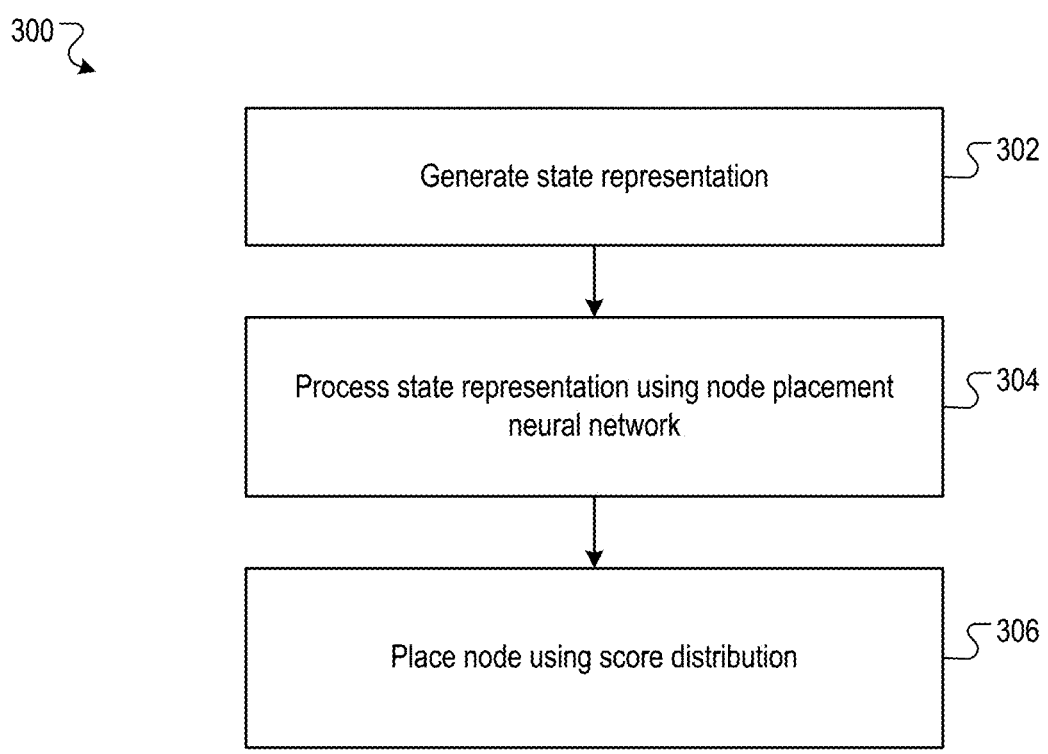
FIG. 3 is a flow diagram of an example process for placing a node at a particular time step.

FIG. 3 is a flow diagram of an example process 300 for placing a node at a given time step. For convenience, the process 300 will be described as being performed by a system of one or more computers located in one or more locations. For example, a floorplan generation system, e.g., the floorplan generation system 100 of FIG. 1, appropriately programmed, can perform the process 300.

The system can perform the process 300 for each time step in the sequence of time steps to generate a computer chip floorplan.

The system generates a state representation for the time step (step 302). As described above, the state representation generally includes partially placed chip data and current node data.

The system processes the state representation for the time step using the node placement neural network to generate a score distribution over the positions (step 304).

The system places the node using the score distribution (step 306). As described above, the system can modify the score distribution based on the density of the positions on the surface of the chip and then select a position for the node based on the modified score distribution.

Figure 4:
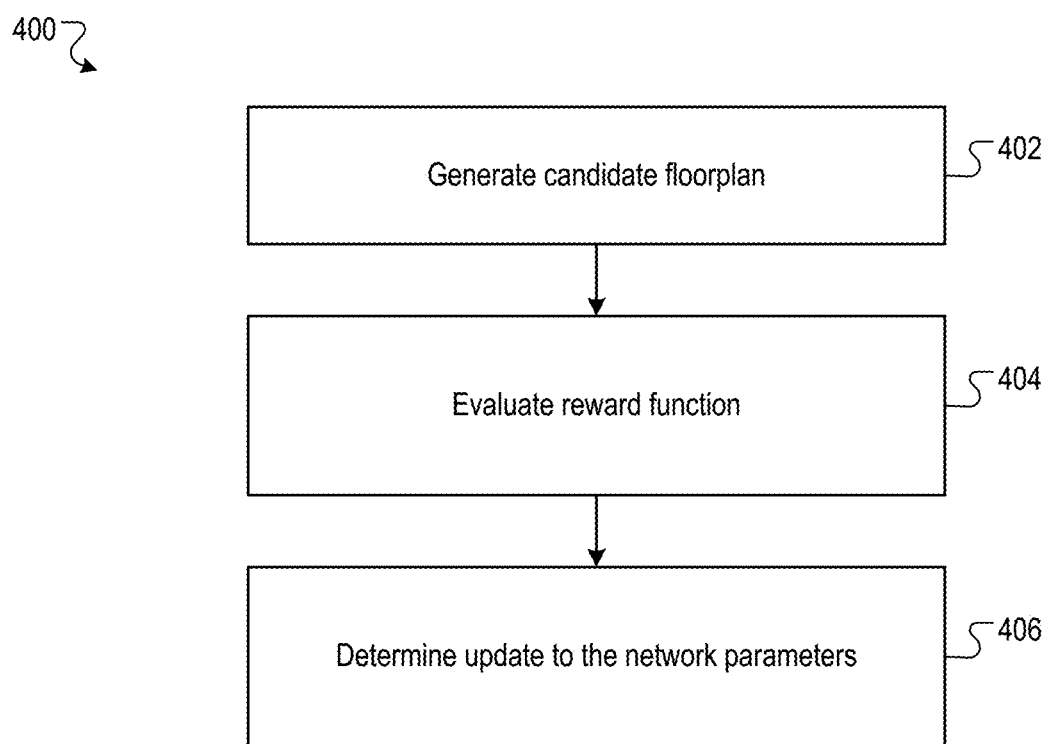
FIG. 4 is a flow diagram of an example process for training the node placement neural network through reinforcement learning.

FIG. 4 is a flow diagram of an example process 400 for training the node placement neural network. For convenience, the process 400 will be described as being performed by a system of one or more computers located in one or more locations. For example, a floorplan generation system, e.g., the floorplan generation system 100 of FIG. 1, appropriately programmed, can perform the process 400.

The system can repeatedly perform the process 400 to train the node placement neural network, i.e., to determine trained values of the network parameters.

In some implementations, the system distributes the training of the node placement neural network across many different workers, i.e., across many different homogenous or heterogeneous computing devices, i.e., devices that perform training computations using CPUs, GPUs, or ASICs. In some of these implementations, some or all of the steps 400 can be performed in parallel by many different workers operating asynchronously from one another in order to speed up the training of the node placement neural network. In other implementations, the different workers operate synchronously to perform iterations of the process 400 in parallel in order to speed up the training of the neural network.

The system generates a candidate floorplan using the node placement neural network and in accordance with current values of the network parameters (step 402) as described above with reference to FIG. 2.

The system evaluates the reward function to determine a reward for the generated candidate floorplan (step 404).

As described above, the reward function generally measures the quality of the floorplans generated using the node placement neural network.

More specifically, the reward function, i.e., measures certain characteristics of the generated floorplans that, when optimized, result in a chip that is manufactured using the generated floorplan exhibiting good performance, e.g., in terms of one or more power consumption, heat generation, and timing performance.

In particular, the reward function incudes a respective term for one or more characteristics. For example, when there are multiple terms, the reward function can be a sum or a weighted sum of the multiple terms.

As one example, the reward function can include a wire length measure, i.e., a term that measures wire length, that is higher when the wire length between nodes on the surface of the chip is shorter. For example, the wire length can be the Manhattan distance or other distance measure between all of the adjacent nodes on the surface of the chip.

As another example, the reward function can include a congestion measure, i.e., a term that measures congestion, that is higher when congestion on the surface of the computer chip is lower. Congestion is a measure of the difference between available wiring resources in a given region (not necessarily a contiguous region) on the chip versus the actual wires that run through the region. For example, the congestion may be defined as the ratio of the wires that run through the region in the generated floorplan to the available wiring resources (e.g., a maximum number of wires which can run though that region). As a particular example, the congestion measure can track the density of wires across the horizontal and vertical edges of the surface. In particular, the system can make use of a routing model for the netlist (e.g., net bounding box, upper L, lower L, A*, minimum spanning tree, or actual routed net, and so on). Based on this routing model, the congestion measure can be calculated by determining the ratio of, for each position on the surface, the available wiring resources in the floorplan versus wiring estimates from the routing model for the position.

As another example, the reward function can include a timing term, i.e., a term that measures timing of the digital logic, that is higher when the performance of the chip is better (e.g., the reward function takes a correspondingly a higher value for floorplans of respective chips which take less time to perform a certain computational task). Timing or performance of a floorplan can be measured using static timing analysis (STA). This measurement can include calculating stage delays over logic paths (including internal cell delays and wire delays) and finding critical paths that would determine the maximum speed the clock can run for safe operation. For a realistic view of timing, logic optimization may be necessary to accommodate paths getting longer or shorter as node placements are in progress.

As another example, the reward function can include one or more terms that measure the power or energy that would be consumed by the chip, i.e., one or more terms that are higher when the power that would be consumed by the chip is lower.

As another example, the reward function can include one or more terms that measure the area of the floorplan, i.e., that are higher when the area taken up by the floorplan is lower.

The system determines, using a reinforcement learning technique, an update to the current values of the network parameters (step 406).

In particular, the system determines a gradient with respect to the network parameters of the reinforcement loss function corresponding to the reinforcement learning technique and then computes the update from the determined gradient in accordance with an appropriate update rule, e.g., a stochastic gradient descent update rule, an Adam update rule, or an rmsProp update role.

As one particular example of how the training can be distributed among multiple workers, each of multiple workers can perform steps 402 through 406 of the process and then compute gradients in parallel. The multiple workers can then transmit the computed gradients to a parameter server, which can compute the updates and then update the network parameters.

The system can use any of a variety of reinforcement learning techniques to train the node placement neural network. For example, the system can use a policy gradient technique, e.g., REINFORCE or Proximal Policy Optimization (PPO), for the training. In these cases, the value prediction generated by the value subnetwork can be used to compute the baseline value that modifies the reward function value when computing the gradient of the reinforcement learning loss function.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining netlist data for a computer chip, wherein the netlist data specifies a connectivity on a computer chip between a plurality of nodes that each correspond to one or more of a plurality of integrated circuit components of the computer chip, wherein the plurality of nodes comprises nodes representing at least macros and nodes representing clusters of standard cells; and
    generating a computer chip floorplan that places each node in the netlist data at a respective position on the surface of the computer chip, comprising:
    placing at least the nodes representing the macros on the surface of the computer chip, comprising placing a respective node at each of a plurality of time steps in a sequence of time steps, the placing comprising, for each particular time step of the plurality of time steps:
        generating an input representation for the particular time step that characterizes at least (i) positions on the surface of the computer chip of nodes that have already been placed at time steps preceding the particular time step in the sequence and (ii) the node to be placed at the particular time step;
        processing the input representation using a node placement neural network having a plurality of network parameters, wherein the node placement neural network is configured to process the input representation in accordance with current values of the network parameters to generate a score distribution over a plurality of positions on the surface of the computer chip; and
        assigning the node to be placed at the particular time step to a position from the plurality of positions using the score distribution.

2. The method of claim 1, wherein assigning the node to a position from the plurality of positions using the score distribution comprises:
    generating a modified score distribution that sets to zero the score for each position for which a density determined based on the respective positions on the surface of the chip of the nodes that have already been placed at time steps preceding the particular time step in the sequence exceeds a threshold value; and
    assigning the node using the modified score distribution.

3. The method of claim 2, wherein assigning the node using the modified score distribution comprises:
    assigning the node to the position having the highest score in the modified score distribution.

4. The method of claim 2, wherein assigning the node using the modified score distribution comprises:
    sampling a position from the modified score distribution, and assigning the node to the sampled position.

5. The method of claim 1, wherein the plurality of positions comprise grid squares from an N×M grid overlaid over the surface of the computer chip.

6. The method of claim 1, wherein the input representation comprises data characterizing the connectivity of the node to be placed at the particular time step specified by the netlist data.

7. The method of claim 1, wherein the input representation comprises netlist features that characterize the netlist data.

8. The method of claim 7, wherein the netlist features comprise a respective feature vector for each a plurality of nodes in the netlist.

9. The method of claim 8, wherein the feature vector for each node identifies a size of the node in terms of positions on the surface of the chip.

10. The method of claim 8, wherein, for each node that has already been placed at an earlier time step in the sequence, the feature vector for the node identifies the position at which the node was placed.

11. The method of claim 1, wherein the data characterizing the node to be placed at the particular time step comprises an embedding of the node to be placed at the particular time step.

12. The method of claim 1, wherein the partially placed chip data comprises an image of the surface of a partially placed chip that depicts the positions at which the nodes at time steps preceding the particular time step in the sequence have been placed.

13. The method of claim 12, wherein, in the image, each position of the plurality of positions is associated with a density value that reflects an occupancy of the position in the partially placed chip.

14. The method of claim 1, wherein the node placement neural network comprises:
   an input subnetwork configured to, at each particular time step, process the input representation to generate an embedding of the input representation; and
   a policy subnetwork configured to, at each particular time step, process the embedding to generate the score distribution.

15. The method of claim 14, wherein the input subnetwork comprises a convolutional neural network configured to generate an embedding of a partially placed chip that depicts the positions at which the nodes at time steps preceding the particular time step in the sequence have been placed.

16. The method of claim 14, wherein the input subnetwork comprises a graph convolutional neural network configured to generate an embedding of the data characterizing the node to be placed and the netlist feature data.

17. The method of claim 14, wherein the node placement neural network comprises:
   a value subnetwork configured to, at each particular time step, process the embedding to generate a value estimate that estimates a value of a current state of the floorplan as of the particular time step.

18. The method of claim 17, wherein the reward function includes a congestion measure that is higher when congestion on the surface of the computer chip is lower.

19. The method of claim 1, further comprising:
   determining the current values of the network parameters by training the node placement neural network through reinforcement learning to generate probability distributions that maximize a reward function that measures a quality of floorplans generated using the node placement neural network.

20. The method of claim 19, wherein the reward function includes a wire length measure that is higher when wire length between nodes on the surface of the chip is shorter.

21. A system comprising one or more computers and one or more storage devices storing instructions that when executed by the one or more computers cause the one or more computers to perform operations comprising:
   obtaining netlist data for a computer chip, wherein the netlist data specifies a connectivity on a computer chip between a plurality of nodes that each correspond to one or more of a plurality of integrated circuit components of the computer chip, wherein the plurality of nodes comprises nodes representing at least macros and nodes representing clusters of standard cells; and
   generating a computer chip floorplan that places each node in the netlist data at a respective position on the surface of the computer chip, comprising:
      placing at least the nodes representing the macros on the surface of the computer chip, comprising placing a respective node at each of a plurality of time steps in a sequence of time steps, the placing comprising, for each particular time step of the plurality of time steps:
         generating an input representation for the particular time step that characterizes at least (i) positions on the surface of the computer chip of nodes that have already been placed at time steps preceding the particular time step in the sequence and (ii) the node to be placed at the particular time step;
         processing the input representation using a node placement neural network having a plurality of network parameters, wherein the node placement neural network is configured to process the input representation in accordance with current values of the network parameters to generate a score distribution over a plurality of positions on the surface of the computer chip; and
         assigning the node to be placed at the particular time step to a position from the plurality of positions using the score distribution.

22. The system of claim 21, wherein assigning the node to a position from the plurality of positions using the score distribution comprises:
   generating a modified score distribution that sets to zero the score for each position for which a density determined based on the respective positions on the surface of the chip of the nodes that have already been placed at time steps preceding the particular time step in the sequence exceeds a threshold value; and
   assigning the node using the modified score distribution.

23. The system of claim 21, wherein the plurality of positions comprise grid squares from an N×M grid overlaid over the surface of the computer chip.

24. The system of claim 21, wherein the input representation comprises data characterizing the connectivity of the node to be placed at the particular time step specified by the netlist data.

25. The system of claim 21, wherein the input representation comprises a respective feature vector for each a plurality of nodes in the netlist.

26. The system of claim 25, wherein, for each node that has already been placed at an earlier time step in the sequence, the feature vector for the node identifies the position at which the node was placed.

27. The system of claim 21, wherein the data characterizing the node to be placed at the particular time step comprises an embedding of the node to be placed at the particular time step.

28. The system of claim 21, wherein the node placement neural network comprises:
   an input subnetwork configured to, at each particular time step, process the input representation to generate an embedding of the input representation; and
   a policy subnetwork configured to, at each particular time step, process the embedding to generate the score distribution.

29. The system of claim 21, the operations further comprising:
   determining the current values of the network parameters by training the node placement neural network through reinforcement learning to generate probability distributions that maximize a reward function that measures a quality of floorplans generated using the node placement neural network.

30. The system of claim 29, wherein the reward function includes a wire length measure that is higher when wire length between nodes on the surface of the chip is shorter.

31. One or more non-transitory computer-readable storage media storing instructions that when executed by one or more computers cause the one or more computers to perform operations comprising:

obtaining netlist data for a computer chip, wherein the netlist data specifies a connectivity on a computer chip between a plurality of nodes that each correspond to one or more of a plurality of integrated circuit components of the computer chip, wherein the plurality of nodes comprises nodes representing at least macros and nodes representing clusters of standard cells; and generating a computer chip floorplan that places each node in the netlist data at a respective position on the surface of the computer chip, comprising:

placing at least the nodes representing the macros on the surface of the computer chip, comprising placing a respective node at each of a plurality of time steps in a sequence of time steps, the placing comprising, for each particular time step of the plurality of time steps:

generating an input representation for the particular time step that characterizes at least (i) positions on the surface of the computer chip of nodes that have already been placed at time steps preceding the particular time step in the sequence and (ii) the node to be placed at the particular time step;

processing the input representation using a node placement neural network having a plurality of network parameters, wherein the node placement neural network is configured to process the input representation in accordance with current values of the network parameters to generate a score distribution over a plurality of positions on the surface of the computer chip; and assigning the node to be placed at the particular time step to a position from the plurality of positions using the score distribution.

32. The computer-readable storage media of claim 31, wherein assigning the node to a position from the plurality of positions using the score distribution comprises:

generating a modified score distribution that sets to zero the score for each position for which a density determined based on the respective positions on the surface of the chip of the nodes that have already been placed at time steps preceding the particular time step in the sequence exceeds a threshold value; and assigning the node using the modified score distribution.

33. The computer-readable storage media of claim 31, wherein the plurality of positions comprise grid squares from an N×M grid overlaid over the surface of the computer chip.

34. The computer-readable storage media of claim 31, wherein the input representation comprises data characterizing the connectivity of the node to be placed at the particular time step specified by the netlist data.

35. The computer-readable storage media of claim 31, wherein the input representation comprises a respective feature vector for each a plurality of nodes in the netlist.

36. The computer-readable storage media of claim 35, wherein, for each node that has already been placed at an earlier time step in the sequence, the feature vector for the node identifies the position at which the node was placed.

37. The computer-readable storage media of claim 31, wherein the data characterizing the node to be placed at the particular time step comprises an embedding of the node to be placed at the particular time step.

38. The computer-readable storage media of claim 31, wherein the node placement neural network comprises:

an input subnetwork configured to, at each particular time step, process the input representation to generate an embedding of the input representation; and a policy subnetwork configured to, at each particular time step, process the embedding to generate the score distribution.

39. The computer-readable storage media of claim 31, the operations further comprising:

determining the current values of the network parameters by training the node placement neural network through reinforcement learning to generate probability distributions that maximize a reward function that measures a quality of floorplans generated using the node placement neural network.

40. The computer-readable storage media of claim 39, wherein the reward function includes a wire length measure that is higher when wire length between nodes on the surface of the chip is shorter.

* * * * *